J. BRENZINGER.
GEARING.
APPLICATION FILED AUG. 13, 1908.

1,020,477.

Patented Mar. 19, 1912.

Witnesses
Louise Enderle.

Julius Brenzinger Inventor
By his Attorney

UNITED STATES PATENT OFFICE.

JULIUS BRENZINGER, OF MOUNT VERNON, NEW YORK.

GEARING.

1,020,477. Specification of Letters Patent. Patented Mar. 19, 1912.

Application filed August 13, 1908. Serial No. 448,335.

*To all whom it may concern:*

Be it known that I, JULIUS BRENZINGER, a citizen of the United States, residing at Mount Vernon, in the county of Westchester and State of New York, have invented certain new and useful Improvements in Gearing, of which the following is a specification, reference being had therein to the accompanying drawing.

My invention relates to improvements in gearing for saws and has particular reference to gearing for jig saws adapted for use by silversmiths.

Figure 1:
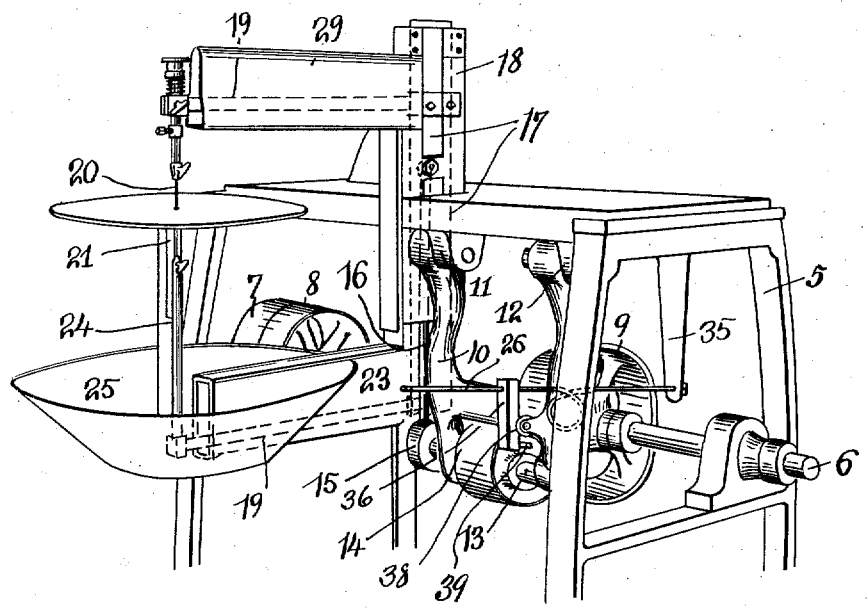
Figure 2:
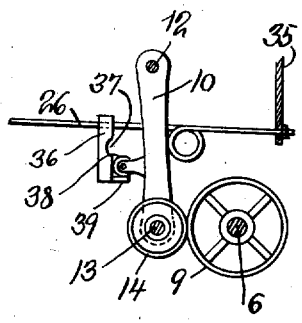

Referring to the accompanying drawings, Figure 1 is a perspective view of a jig saw embodying one form of my invention, and Fig. 2 a detail view of parts of the driving mechanism.

5 is the frame of the table, 6 is a shaft suitably mounted upon same and provided with fast and loose pulleys 7 and 8 and friction pulley 9 mounted thereupon and fastened thereto, and 10 is a frame mounted in the bearings 11 and 12, provided with the counter shaft 13 which is provided with the fixed friction pulley 14 and crank disk 15.

16 is a connecting rod suitably attached to the crank disk and to the cross head 17 slidably mounted in the guide 18 and carrying the arms 19 of the saw holder. 20 is the saw and 21 is the table stem through which it passes. 23 is a casing of the machine in which the other arm 19 of the saw holder operates and the arm 19 carries the stem 24 into which the other end of the blade of the saw is secured and 25 is a tray which may be attached beneath the saw table as shown for catching the dust from the saw.

26 is a spring rod fastened to the lug 35 and carrying a catch 36 having a recess 37 for receiving the roll 38 which latter is fast on the hanging frame 10. A stop 39 is fast in the catch 36 below the recess 37. When the roll 38 is in the recess 37 the friction pulleys are running free but on raising the rod 26 the roll 38 rides on the face of the catch 36 and causes the friction pulleys to come together under tension of the spring rod 26. The tension of the spring rod 26 thereby causes the swinging frame 10 carrying the shaft 13 to cause the fixed friction pulley 14 and fixed friction driving pulley 9 to come together and the necessary power is thereby transmitted to the disk 15 and through the rod 16 to the cross head 17 and saw as stated. That is to say, when the spring rod 26 is pressed down the roller 38 slips into the recess 37 and the swinging frame 10 hangs loosely so that the pulleys 14 and 9 are not in working contact but when the spring rod 26 is raised the roller 38 is forced out of the recess 37 and carries the spring 14 in the frame 10 against the pulley 9.

In operating the machine the driving belt runs on the loose pulley 8 from which it may be run on the fast pulley 7 thereby driving the shaft 6. When the operator has set up the machine and has his work in position he can throw the catch 36 upward whereby the roll 38 passes out of the recess 37 and the friction pulleys engage as shown in Fig. 2, the stop 39 limiting the upward throw of catch 36. The friction pulley 9 operates the friction pulley 14 mounted upon the shaft 13 which drives the crank disk 15 and connecting rod connected thereto and to the cross-head, which in turn operates the saw. To stop the machine it is only necessary to move the catch 36 downward when the recess 37 engages the roll 38 whereby the two friction pulleys are disengaged.

Various modifications may be made without departing from the spirit of the invention.

Having described my invention, what I claim as new, and desire to secure by Letters Patent, is:—

In a power driven machine, transmission mechanism comprising a friction driving pulley, a swinging frame and shaft mounted therein, a friction pulley and driving mechanism upon said shaft, retaining means adjacent to said frame provided with a recess, said retaining means being adapted to be shifted by hand in such a manner that when shifted in one direction said frame hangs loosely with reference to said retaining means and when shifted in the other direction said frame is moved by said retaining means and shifts said friction pulley against said driving friction pulley.

In testimony whereof I affix my signature in presence of two witnesses.

JULIUS BRENZINGER.

Witnesses:
LOUISE ENDERLE,
THOMAS A. HILL.

Copies of this patent may be obtained for five cents each, by addressing the "Commissioner of Patents, Washington, D. C."